United States Patent
Yao

(10) Patent No.: US 11,434,978 B1
(45) Date of Patent: Sep. 6, 2022

(54) ROLLER-TYPE SPEED REDUCTION MECHANISM WITH LATERAL OUTPUT

(71) Applicant: Tsun-Tien Yao, Taichung (TW)

(72) Inventor: Tsun-Tien Yao, Taichung (TW)

( * ) Notice: Subject to any disclaimer, the term of this patent is extended or adjusted under 35 U.S.C. 154(b) by 0 days.

(21) Appl. No.: 17/355,575

(22) Filed: Jun. 23, 2021

(51) Int. Cl.
*F16H 1/32* (2006.01)
*F16H 25/06* (2006.01)

(52) U.S. Cl.
CPC ............... *F16H 1/32* (2013.01); *F16H 25/06* (2013.01)

(58) Field of Classification Search
CPC ....... F16H 1/32; F16H 25/06; F16H 2001/325
See application file for complete search history.

(56) References Cited

U.S. PATENT DOCUMENTS

| | | | | |
|---|---|---|---|---|
| 3,998,112 A | * | 12/1976 | Pierrat | F16H 25/06 475/180 |
| 4,307,630 A | * | 12/1981 | Osborn | F16H 1/32 475/167 |
| 4,471,672 A | * | 9/1984 | Butterfield | F16H 1/32 475/168 |
| 4,537,094 A | * | 8/1985 | Bursa | F16H 25/06 475/168 |
| 4,604,916 A | * | 8/1986 | Distin, Jr. | F16H 25/06 475/168 |
| 5,431,605 A | | 7/1995 | Ko | |
| 9,435,399 B2 | * | 9/2016 | Akami | F16H 1/06 |

FOREIGN PATENT DOCUMENTS

| | | | | |
|---|---|---|---|---|
| CN | 104763778 A | * | 7/2015 | |
| JP | 2011127423 A | * | 6/2011 | E02F 9/123 |
| TW | M431244 U1 | | 6/2012 | |

* cited by examiner

*Primary Examiner* — Sherry L Estremsky
(74) *Attorney, Agent, or Firm* — Chun-Ming Shih; Lanway IPR Services

(57) ABSTRACT

A speed reduction mechanism with radial output is disclosed. The roller reduction mechanism includes a speed reducer and an output shaft structure. The speed reducer has an input side and an output side. The output shaft structure is fastened at the output side of the speed reducer and is driven by the speed reducer to rotate. The output shaft structure is combined with the speed reducer and a first bearing and a second bearing with tapered shapes respectively is sleeved at a pivot shaft of the output shaft structure, so that the speed reducer may bear a larger axial force and the first and second bearings with tapered shapes respectively may increase a lateral force of the output shaft structure.

1 Claim, 7 Drawing Sheets

ROLLER-TYPE SPEED REDUCTION MECHANISM WITH LATERAL OUTPUT

FIELD OF THE INVENTION

The present invention relates to a roller-type speed reduction mechanism, and more particularly to a roller-type speed reduction mechanism with lateral output.

BACKGROUND OF THE INVENTION

In the conventional planetary transmission, the balance wheel transmission is widely used. The profile of the planetary gear tooth adopts the parallel curve of the short epicycloid, which is complicated to process, the accuracy is difficult to control, the variation of the curtate ratio is large, and the phenomenon of undercutting and stress concentration is occurred easily.

Please reference to U.S. Pat. No. 5,431,605. The conventional is speed reducer with rollers is disclosed. The speed reducer includes a casing, a high speed shaft connecting to an eccentric rod which has a variety of hollow pinion rollers disposed thereon. A plurality of slow speed shaft pins revolvably disposed in the pinion rollers respectively have one end opposite from the high speed shaft to connect to a slow speed shaft. A gear roller keeping ring is mounted on the pinion rollers for confining the pinion rollers thereto. A plurality of ring gear pins respectively enveloped with a ring gear roller for being rotatably engaged with the hollow pinion rollers, have their both ends connecting to the internal surface of the casing. Rotation of the eccentric rod drives revolution of the pinion rollers about the ring gear pins to actuate the slow speed shaft pins to revolve in the pinion rollers to achieve the speed reduction.

Furthermore, please reference to Taiwanese Patent No. M431244, which is disclosed "an outward-rotating full-roller transmission structure" (conventional speed reducer with rollers) and issued on Jun. 11, 2012. It does not need to use an output shaft and only uses the rotation of the outer cylinder shell to achieve the deceleration effect. In addition, it saves parts, simplifies the structure, reduces the cost of the ground, and reduces the overall thickness, so as to conform to the current thinner market trend.

However, the speed reducer currently used in the swing arm of the car shock absorber is a passive shock absorber and has a large is volume, which requires a large space for installation on the car. Furthermore, the conventional speed reducer cannot bear large axial force and lateral force, and it is easy to break or deform an output shaft.

Therefore, how to match the conventional "outward-rotating full-roller transmission structure" (conventional speed reducer with rollers) with the output shaft to achieve the standard load that can combine the axial force and the lateral force used by the automobile (i.e. the car) is what the inventor of this application wants the main problem to be solved.

In view of the foregoing circumstances, the inventor has invested a lot of time to study the relevant knowledge, compare the pros and cons, research and develop related products.

SUMMARY OF THE INVENTION

An object of this invention is providing a roller-type speed reduction mechanism with lateral output. The output shaft structure is combined with a conventional speed reducer with rollers (i.e. the aforementioned "outward-rotating full-roller transmission structure") and a first bearing and a second bearing with tapered shapes respectively is sleeved at a pivot shaft of the output shaft structure, so that the roller-type speed reduction mechanism may bear a larger is axial force and the first and second bearings with tapered shapes respectively may increase a lateral force of the output shaft structure to make the output torque, high input speed, and the overall strength be sufficient under the condition of frequent forward and reverse rotation, and further to meet the standard specification of the speed reducer of the car shock absorber. For example, the axial force of the standard specification is between about 4500N to about 5000N, and the lateral force of the standard specification is between about 9500N to about 10000N.

To achieve above objects, a roller-type speed reduction mechanism is provided and comprises a roller-type speed reducer, having an input side and an output side; and an output shaft structure, fastened to the output side of the roller-type speed reducer and driven by the roller-type speed reducer to rotate.

In some embodiments, the output shaft structure at least includes a disc and a pivot shaft. The disc is combined with the output side of the roller-type speed reducer, and the pivot shaft extends from a center of the disc toward a direction which is distant from the roller-type speed reducer.

In some embodiments, the roller-type speed reduction mechanism further comprises a first bearing and a second bearing. The first bearing is sleeved at one end of the pivot shaft adjacent to the disc, and the second bearing is sleeved at the other end of the pivot shaft distant from the disc.

In some embodiments, the first bearing and the second bearing are spaced apart from each other.

In some embodiments, a longitudinal cross section profile of the first bearing is tapered, and the first bearing has a thickness which is gradually increased from adjacent to the disc toward away from the disc.

In some embodiments, a longitudinal cross section profile of the second bearing is tapered, and the second bearing has a thickness which is gradually decreased from adjacent to the disc toward away from the disc.

In some embodiments, the output shaft structure includes a threaded shaft and a gear shaft. The threaded shaft is connected to one end of the pivot shaft distant from the disc, and the gear shaft is connected to one end of the threaded shaft distant from the pivot shaft.

In some embodiments, the roller-type speed reduction mechanism further comprises a fixed inner screw ring fastened and screwed to the threaded shaft.

In some embodiments, the roller-type speed reduction mechanism further comprises an outer cap covering at outside of the output shaft structure and fastened to an outer cylinder of the roller-type speed reducer, and the gear shaft passes through the outer cap.

In some embodiments, the output shaft structure includes a is first C-ring, a second C-ring and a sealing ring. The sealing ring is sleeved at outside of the fixed inner screw ring. The first C-ring and the second C-ring are sleeved at outside of the fixed inner screw ring. The first C-ring is attached to one side of the fixed inner screw ring adjacent to the second bearing. The second C-ring is attached to one side of the fixed inner screw ring distant from the second bearing. The first C-ring, the second C-ring and the sealing ring are surrounded by the second bearing, the outer cap and the fixed inner screw ring.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
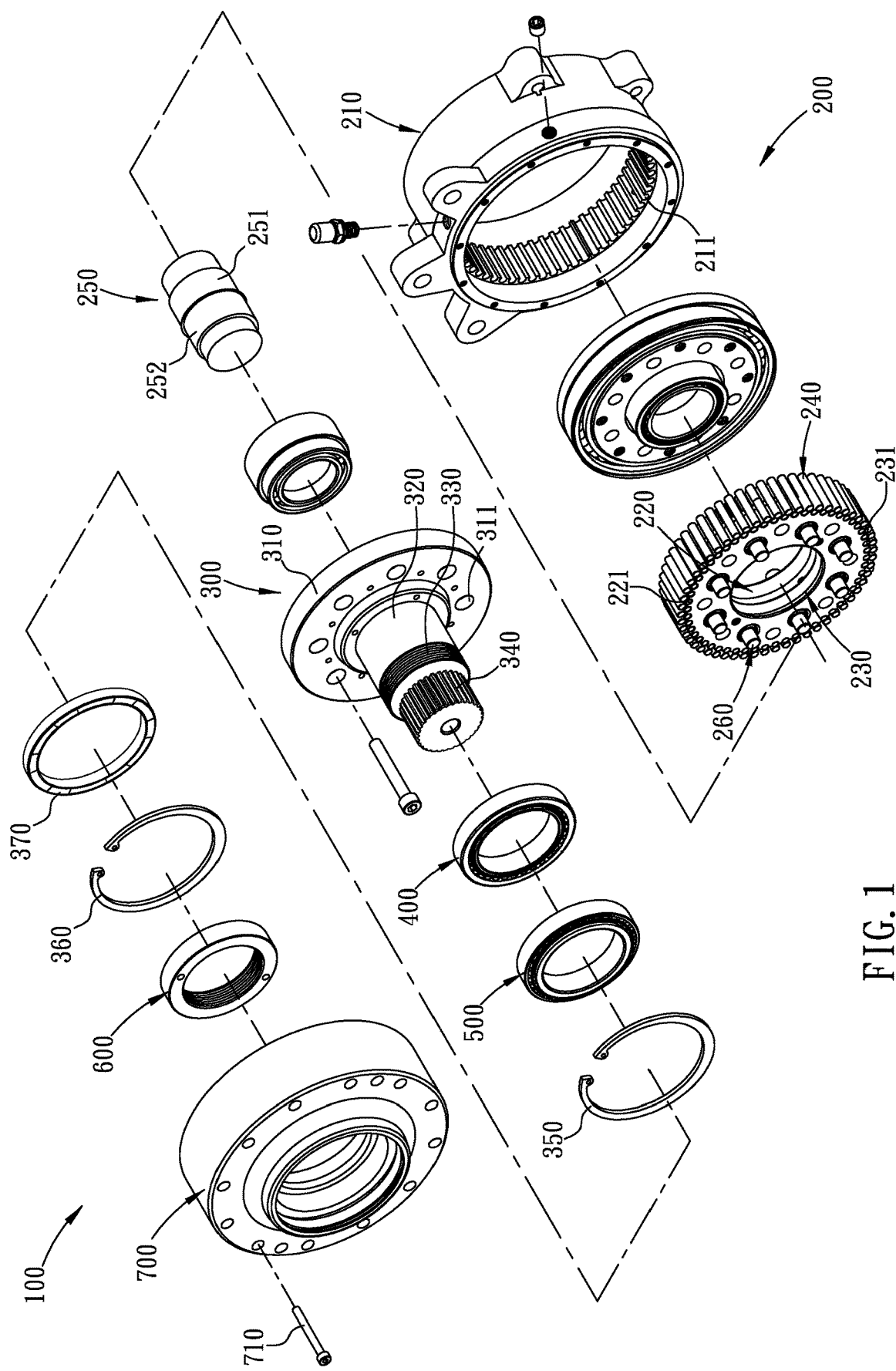
FIG. 1 is an exploded view of a roller-type speed reduction mechanism according to some embodiments of the present invention.

Referring now to the drawings where like characteristics and features among the various figures are denoted by like reference characters.

FIG. 1 is an exploded view of a roller-type speed reduction mechanism according to some embodiments of the present invention. is Please refer to FIG. 1, a roller-type speed reduction mechanism 100 of present disclosure includes a roller-type speed reducer 200 and an output shaft structure 300. The detail descriptions of the roller-type speed reducer 200 may reference to the Taiwanese Patent No. M431244, and only the key components are described below.

The roller-type speed reducer 200 at least includes an outer cylinder 210, a first stop ring 220, a second stop ring 230, a plurality of rollers 240 and an eccentric cam 250. A plurality of third grooves 211 is arranged at an inner sidewall of the outer cylinder 210 and angularly spaced apart from each other. The first stop ring 220 and the second stop ring 230 are both arranged in the outer cylinder 210. A plurality of first grooves 221 is arranged at an outer peripheral of the first stop ring 220 and angularly spaced apart from each other. A plurality of second grooves 231 is arranged at an outer peripheral of the second stop ring 230 and angularly spaced apart from each other. The spaces defined by the first grooves 221, the second grooves 23 and the third grooves 211 are respectively provided to rollablly arrange.

The eccentric cam 250 passes through the first stop ring 220 and the second stop ring 230. The eccentric cam 250 has a first eccentric shaft portion 251 and a second eccentric shaft portion 252 arranged eccentrically to the first eccentric shaft portion 251. The first is eccentric shaft portion 251 is arranged corresponding to the first stop ring 220, and the second eccentric shaft portion 252 is arranged corresponding to the second stop ring 230. Therefore, when the eccentric cam 250 rotates, it may drive the first stop ring 220 and the second stop ring 230 respectively to rotate because of the eccentric rotation of the first eccentric shaft portion 251 and the second eccentric shaft portion 252 eccentrically arranged each other and the arrangement of the rollers 240. In addition, a plurality of linking shafts 260 may pass through the first stop ring 220 and the second stop ring 230. The linking shafts 260 may be rotated with the rotation of the first stop ring 220 and the second stop ring 230.

Figure 2:
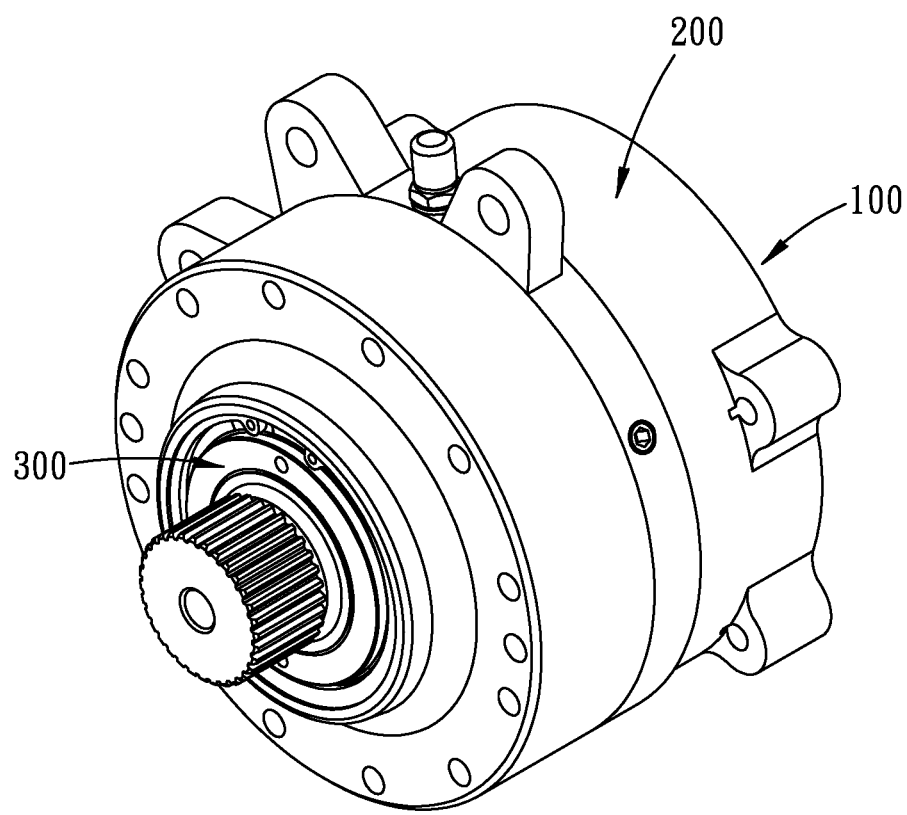
FIG. 2 is a schematic view of the roller-type speed reduction mechanism viewed from an output side thereof according to some embodiments of the present invention.
Figure 3:
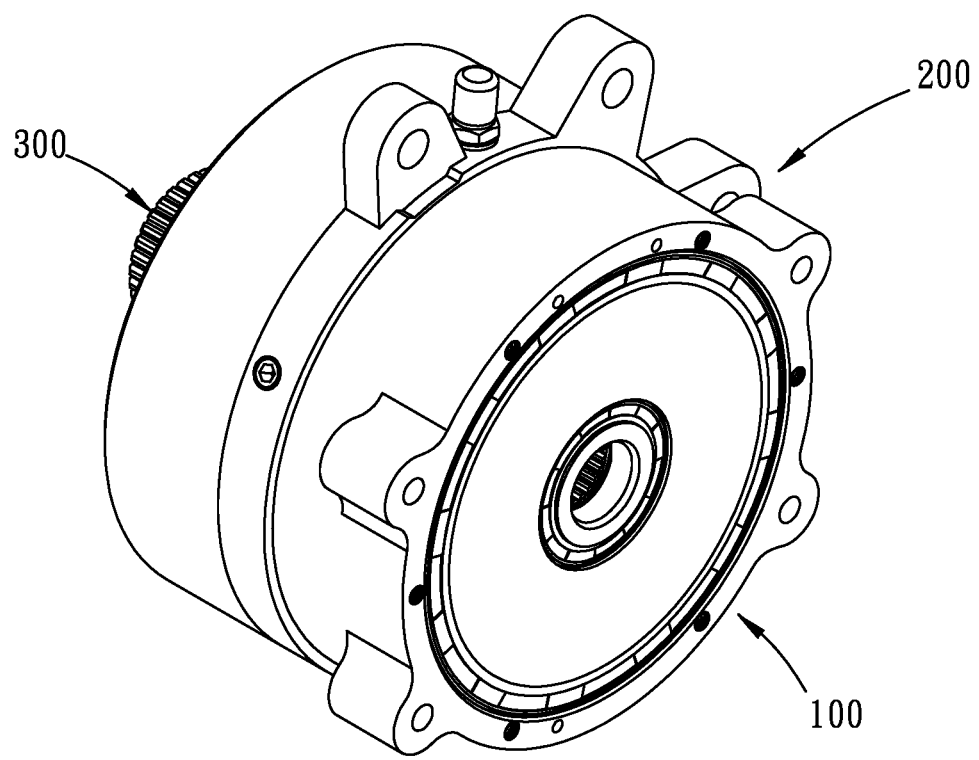
FIG. 3 is a schematic view of the roller-type speed reduction mechanism viewed from an input side thereof according to some embodiments of the present invention.
Figure 4:
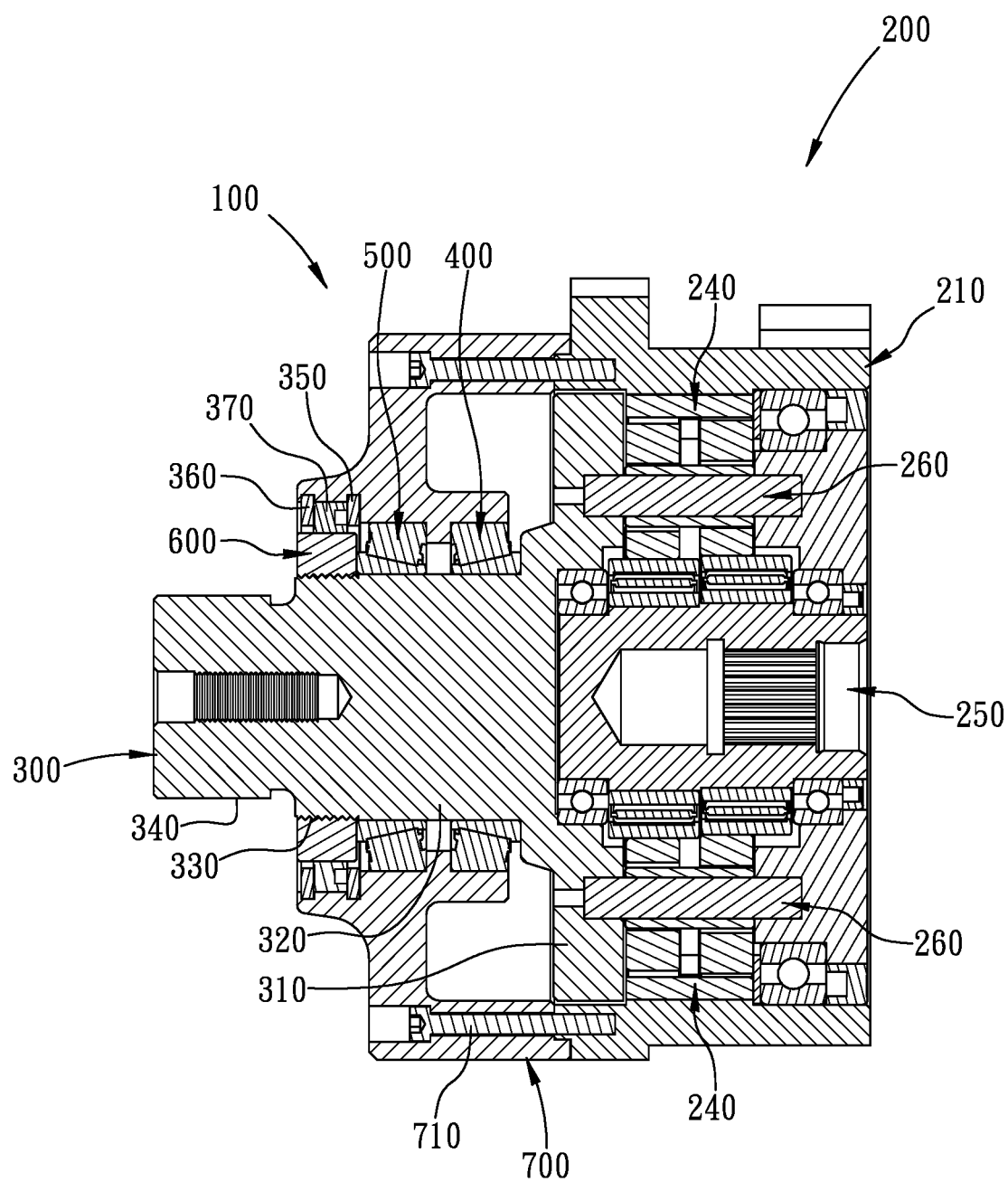
FIG. 4 is a cross-sectional view of the roller-type speed reduction mechanism cut from two rollers thereof according to some embodiments of the present invention.
Figure 5:
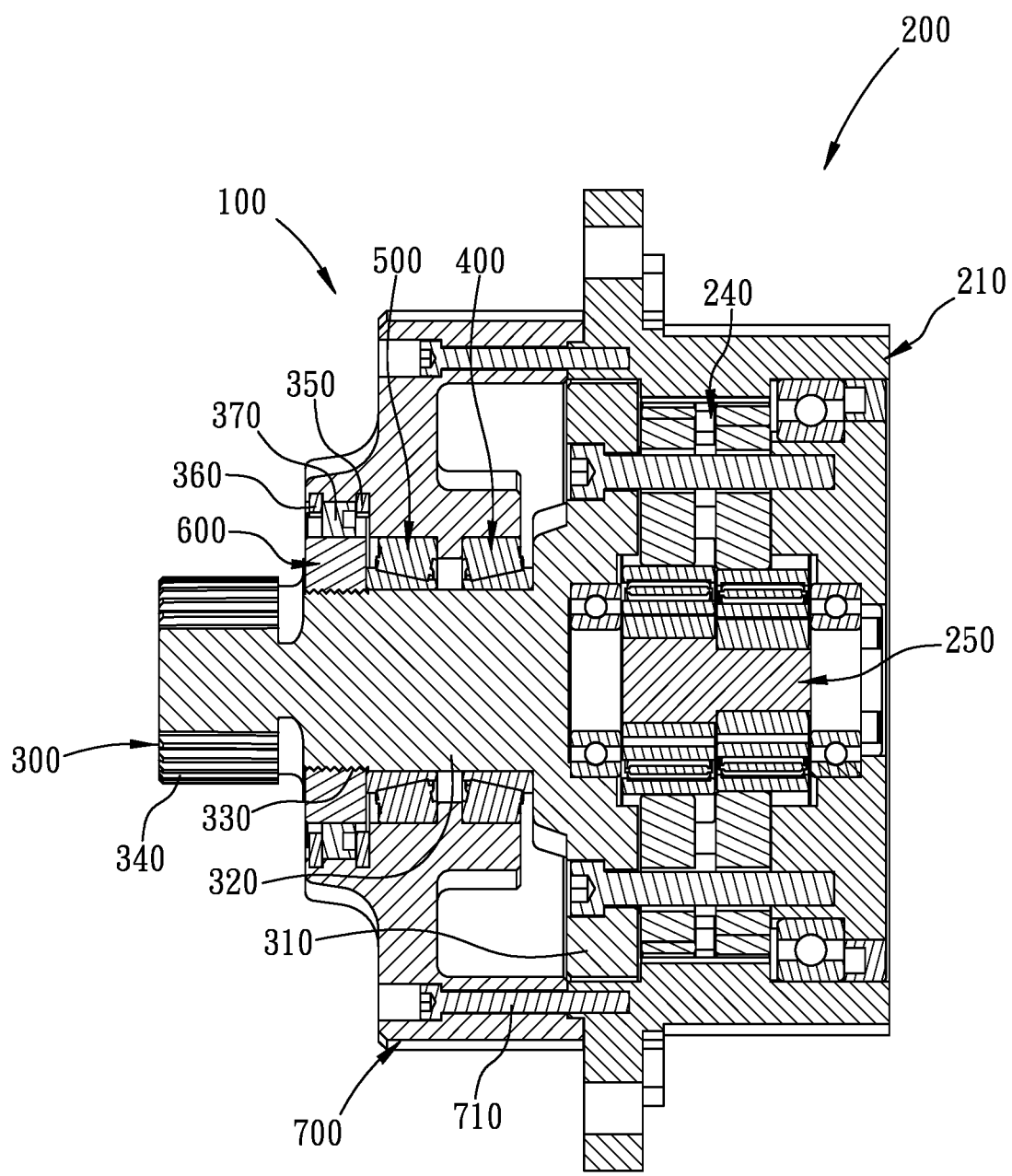
FIG. 5 is a cross-sectional view of the roller-type speed reduction mechanism cut from two bolts thereof according to some embodiments of the present invention.
Figure 6:
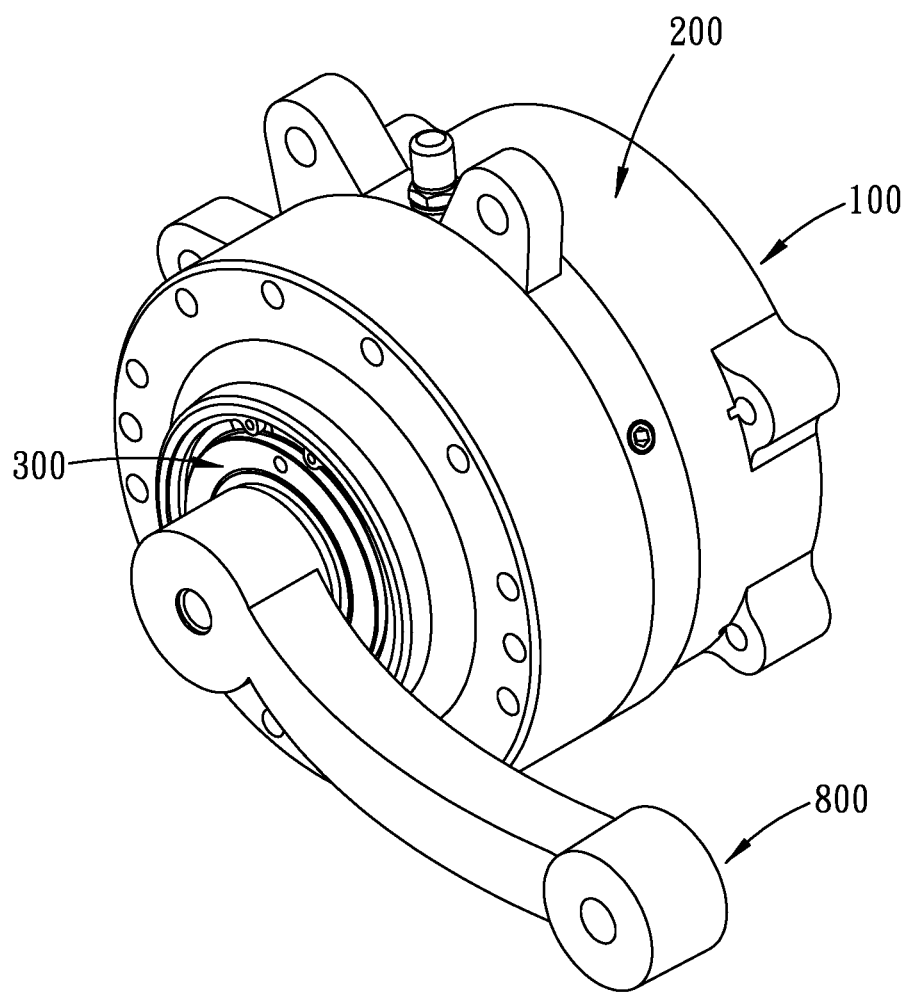
FIG. 6 is a schematic view of the roller-type speed reduction mechanism combined with a sewing arm of a car shock absorber according to some embodiments of the present invention.
Figure 7:
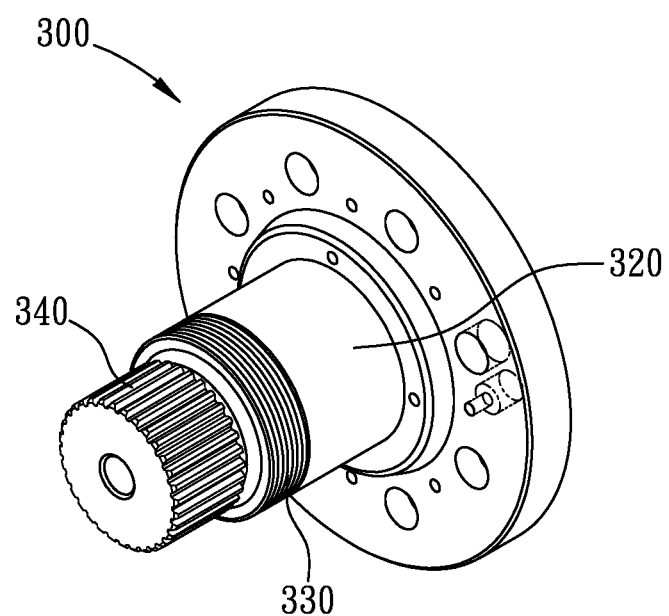
FIG. 7 is a schematic view of an output shaft structure of the roller-type speed reduction mechanism according to some embodiments of the present invention.

FIG. 2 is a schematic view of the roller-type speed reduction mechanism viewed from an output side thereof according to some embodiments of the present invention. FIG. 3 is a schematic view of the roller-type speed reduction mechanism viewed from an input side thereof according to some embodiments of the present invention. FIG. 4 is a cross-sectional view of the roller-type speed reduction mechanism cut from two rollers thereof according to some embodiments of the present invention. FIG. 5 is a cross-sectional view of the roller-type speed reduction mechanism cut from two bolts thereof according to some embodiments of the present invention. FIG. 6 is a schematic view of the roller-type speed reduction mechanism combined with a swing arm of a car shock absorber according to some embodiments of the present invention. FIG. 7 is a schematic view of an output shaft structure of the roller-type speed reduction mechanism according to some embodiments of the present invention.

Please refer to FIGS. 1 to 5 and FIG. 7, the output shaft structure 300 at least includes a disc 310 and a pivot shaft 320. The disc 310 has a plurality of connecting holes 311 which are angularly spaced apart from each other and is respectively combined with the linking shafts 260 arranged at the output side of the roller-type speed reducer 200; thereby, the disc 310 (i.e. the whole output shaft structure 300) is driven to rotate.

The pivot shaft 320 extends from a center of the disc 310 toward a direction which is distant from the roller-type speed reducer 200. In some embodiments, the output shaft structure 300 further includes a threaded shaft 330 and a gear shaft 340. The threaded shaft 330 is connected to one end of the pivot shaft 320 distant from the disc 310, and the gear shaft 340 is connected to one end of the threaded shaft 330 distant form the pivot shaft 320.

In some embodiments, the roller-type speed reduction mechanism 100 further includes a first bearing 400 and a second bearing 500. The first bearing 400 is tightly sleeved at one end of the pivot shaft 320 adjacent to the disc 310, and the second bearing 500 is tightly sleeved at one end of the pivot shaft 320 distant from the disc 310. The first bearing 400 and the second bearing 500 are spaced apart from each other.

Preferably, shown as FIGS. 4 and 5, a longitudinal cross section profile of the first bearing 400 is tapered, and the first bearing 400 has a thickness which is gradually increased from adjacent to the disc 310 toward away from the disc 310. Additionally, a longitudinal cross section profile of the second bearing 500 is tapered, and the second bearing 500 has a thickness which is gradually decreased from adjacent to the disc 310 toward away from the disc 310. Besides the roller-type speed reducer 200 may make the output shaft structure 300 (i.e. pivot shaft 320) bear more axial force (about 4500N to about 5000N), the first bearing 400 and the second bearing 500 with tapered shapes respectively may make the output shaft structure 300 (i.e. pivot shaft 320) bear more lateral force (about 9500N to about 10000N).

Please refer to FIGS. 1, 4 and 5, in some embodiments, the roller-type speed reduction mechanism 100 further includes a fixed inner screw ring 600 screwed and fixed to the threaded shaft 330. In some embodiments, the roller-type speed reduction mechanism 100 further includes an outer cap 700 covering outside of the output shaft structure 300. The outer cap 700 is fixed to the outer cylinder 210 of the roller-type speed reducer 200 through a plurality of bolts 710. Simultaneously, the gear shaft 340 may pass through the outer cap 700.

Please refer to FIGS. 1, 4 and 5, in some embodiments, the output structure 300 further includes a first C-ring 350, a second C-ring 360 and a sealing ring 370. The sealing ring 370 is sleeved at outside of the fixed inner screw ring 600. The first C-ring 350 and the second C-ring 360 are sleeved at outside of the fixed inner screw ring 600. The first C-ring 350 is attached to one side of the fixed inner screw ring 600 adjacent to the second bearing 500. The second C-ring 360 is attached to one side of the fixed inner screw ring 600 distant from the second bearing 500. The first C-ring 350, the second C-ring 360 and the sealing ring 370 are surrounded by the second bearing 500, the outer cap 700 and the fixed inner screw ring 600; thereby, the first bearing 400 and the second bearing 500 are sealed.

FIG. 6 is a schematic view of the roller-type speed reduction mechanism combined with a swing arm of a car shock absorber according to some embodiments of the present invention. Please refer to FIG. 6, roller-type speed reduction mechanism 100 may be combined with a swing arm 800 of a car shock absorber (not shown). Since the swing arm of the car shock absorber must bear greater axial force and lateral force to avoid breakage or deformation of the output shaft of the speed reducer, the output shaft of the speed reducer must be able to bear an axial force, which is between about 4500N to about 5000N, and a lateral force, which is between about 9500N to about 10000N, according to the standard specification of manufacturing automobiles.

In conclusions, the output shaft structure 300 is combined with the roller-type speed reducer 200 (i.e. the aforementioned "outward-rotating full-roller transmission structure") and the first bearing 400 and the second bearing 500 with tapered shapes respectively is sleeved at the pivot shaft 320 of the output shaft structure 300, so that the roller-type speed reduction mechanism 100 is may bear a greater axial force and the first and second bearings 400, 500 with tapered shapes respectively may increase a lateral force of the output shaft structure 200 to make the output torque, high input speed, and the overall strength be sufficient under the condition of frequent forward and reverse rotation, and further to meet the standard specification of the speed reducer of the car shock absorber. For example, the axial force of the standard specification is between about 4500N to about 5000N, and the lateral force of the standard specification is between about 9500N to about 10000N.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A speed reduction mechanism, comprising:
   a speed reducer having an input side and an output side; and
   an output shaft structure secured to the output side of the speed reducer and driven by the speed reducer to rotate;
   wherein the output shaft structure includes a disc and a pivot shaft; and
   wherein the disc is combined with the output side of the speed reducer, and the pivot shaft extends from a center of the disc toward a direction which is distant from the speed reducer;
   further comprising a first bearing and a second bearing wherein the first bearing is sleeved at one end of the pivot shaft adjacent to the disc, and the second bearing is sleeved at the other end of the pivot shaft distant from the disc;
   wherein a longitudinal cross section profile of the first bearing is tapered and a longitudinal cross section profile of the second bearing is tapered;
   wherein the output shaft structure includes a threaded shaft and a gear shaft; and
   wherein the threaded shaft is connected to one end of the pivot shaft distant from the disc, and the gear shaft is connected to one end of the threaded shaft distant from the pivot shaft;
   further comprising a fixed inner screw ring fastened and screwed to the threaded shaft;
   further comprising an outer cap covering at outside of the output shaft structure and secured to an outer cylinder of the speed reducer;
   wherein the gear shaft passes through the outer cap;
   wherein the output shaft structure includes a first C-ring, a second C-ring, and a sealing ring; and
   wherein the sealing ring is sleeved at outside of the fixed inner screw ring, the first C-ring and the second C-ring are sleeved at outside of the fixed inner screw ring, the first C-ring is attached to one side of the fixed inner screw ring adjacent to the second bearing, the second C-ring is attached to one side of the fixed inner screw ring distant from the second bearing, and the first C-ring, the second C-ring, and the sealing ring are surrounded by the second bearing, the outer cap, and the fixed inner screw ring.

* * * * *